F. H. FOX.
CROSS CHAIN FOR ANTISKID DEVICES.
APPLICATION FILED JULY 18, 1910.
1,010,884. Patented Dec. 5, 1911.
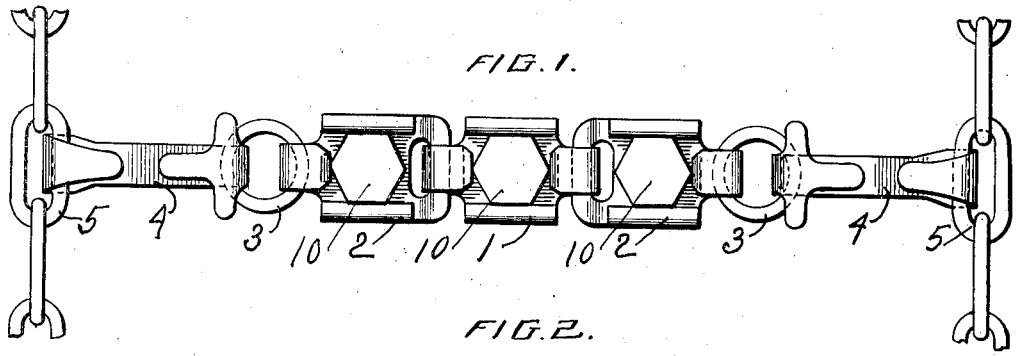
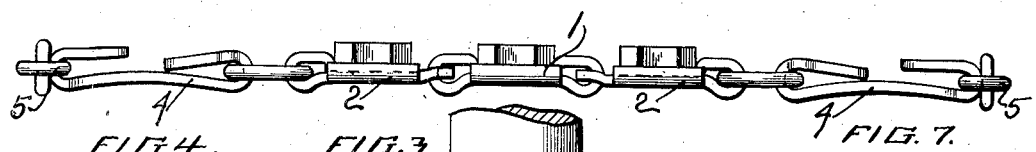
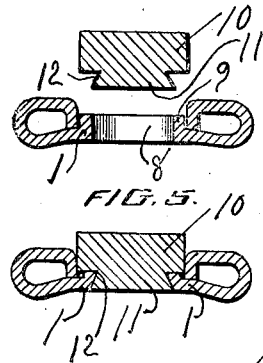
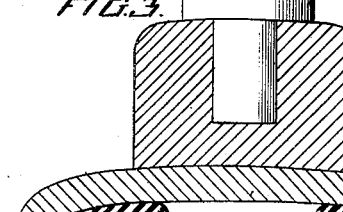
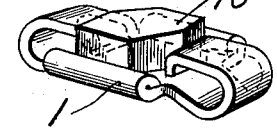
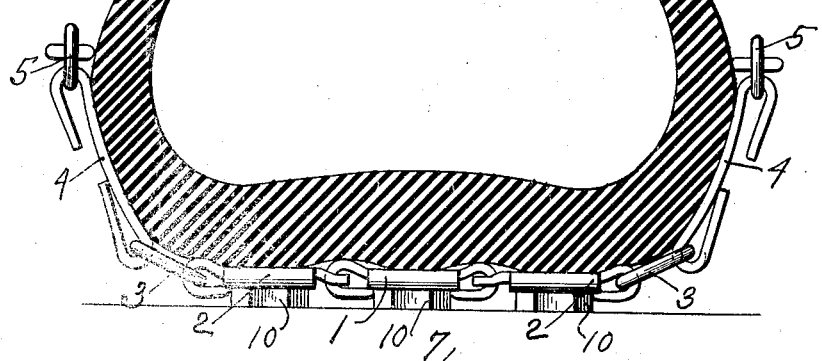
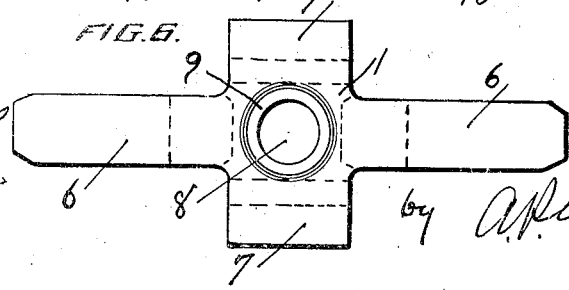
INVENTOR
Floyd Henry Fox
by A. P. Greeley
Attorney

UNITED STATES PATENT OFFICE.

FLOYD HENRY FOX, OF NEW YORK, N. Y.

CROSS-CHAIN FOR ANTISKID DEVICES.

1,010,884.      Specification of Letters Patent.      Patented Dec. 5, 1911.

Application filed July 18, 1910. Serial No. 572,563.

*To all whom it may concern:*

Be it known that I, FLOYD HENRY FOX, a citizen of the United States, residing at New York, in the county of New York, State of New York, have invented certain new and useful Improvements in Cross-Chains for Antiskid Devices, of which the following is a description, reference being had to the accompanying drawings, forming a part hereof.

My invention relates to improvements in cross chains of anti-skid chains for use on tires of automobiles and other vehicles.

Antiskid chains comprise a series of cross chains made up of links, more or less adapted to sustain wear, extended across the tread of the tire and held in place by side chains which extend about the periphery of the rim of the wheel. Considerable difficulty has been experienced in securing cross chains which would stand the very great wear to which they are necessarily subjected in use.

It is the object of my present invention to provide a construction in which wearing or bearing pieces of the requisite hardness to resist wear are secured to links having the requisite toughness and strength to avoid breaking and in which the result desired may be secured at the smallest possible expense.

With these objects in view my invention consists in the construction and combination of parts hereinafter described.

In the drawings: Figure 1 is a plan view of a portion of an antiskid chain showing my invention applied to the links of the cross chain; Fig. 2 is a side view of the chain shown in Fig. 1; Fig. 3 is a cross sectional view of a tire having the cross chain of Figs. 1 and 2 applied thereto; Fig. 4 is a cross-sectional view of a bearing stud and a link the parts being shown in position to be united; Fig. 5 is a cross-sectional view of the parts shown in Fig. 4 after they are secured together; Fig. 6 is a plan view of a center link blank before the bearing stud is secured in position; Fig. 7 is a perspective view and Fig. 8 is a plan view of a center link.

Referring to the drawings, 1 represents the center link of a cross chain comprising in addition to the center link side links 2, 2, rings 3, 3, and hooks 4, 4. The hooks 4, 4, at their outer ends engage the links 5, 5, of the side chains. The number of links may be varied to suit the size of tire to which they are to be applied. The rings 3, 3, and hooks 4, 4, form no part of my present invention and are merely illustrative of convenient means for connecting the links with the side chains, and any other means for this purpose may be used.

The center link is formed from a blank shown in Fig. 6 consisting of a plate of metal preferably steel and preferably also steel comparatively low in carbon so as to possess toughness and strength, having its ends 6 adapted to be bent as indicated in dotted lines to form loops interlocking with the side links 2, 2. The body portion of the blank has its side edges 7, 7, adapted to be rolled inward as shown in dotted lines to form strengthening ribs. At the center of the body portion a round hole 8 is punched from the back of the blank so as to leave surrounding the hole on its inner face an inwardly projecting ring 9.

10 represents the head of the bearing stud of my present invention. The head here shown corresponds in shape and appearance to a hexagonal nut though it may be a round disk or may be of any other shape desired. On the lower side of the head is formed a frusto-conical projection 11 so arranged as to leave between its lower end and the lower end of the head 10, a neck 12. The bearing stud is formed of high carbon steel preferably tempered, after it is made, to a high degree of hardness. The round hole 8 punched, as above described, in the blank from which the center link is formed is of such diameter as to just permit the conical projection 11 to pass through it.

In assembling the parts the conical projection 11 is inserted through the hole 8 until the under surface of the head 10 rests on the upper edge of the ring 9. The bearing stud and blank are then forced together by suitable pressure which causes the metal of the ring 9 to be upset inward into the neck 12 as shown in Fig. 5 thus firmly securing the bearing stud and blank together. The side edges 7 may be rolled inward either before or after the bearing stud is secured in position but preferably not until after it is secured in position. By thus rolling the side edges inward the edges of the link which come in contact with the tire are rounded so that danger of cutting the tire is reduced. The ends 6 of the blank are of course bent up after the link is otherwise complete and after they have been interlocked with the side links 2, 2. The side links 2, 2 are preferably also provided with bearing studs 10 secured in the same manner as the 10 of the center link is secured.

The bearing stud being of hard steel not only resists wear but is adapted to grip and hold on any surface of pavement or ground.

When the head 10 of the wearing stud is hexagonal as shown, the inturned edges 7 of the body portion of the link bear against the sides of the head and thus prevent it from turning in the hole 8.

Having thus described my invention, I claim and desire to secure by Letters Patent:—

1. A link for a cross-chain of an antiskid device for tires comprising a body portion having a circular opening formed therein and a bearing stud secured in said opening, the side edges of the body portion being inturned and bearing against opposite sides of the bearing stud.

2. A link for a cross chain of an antiskid device for tires comprising a body portion having a circular opening formed therein and a bearing stud consisting of a head having opposite flat sides and having on its lower end a projection secured in said opening, the side edges of the body portion being inturned and bearing against the opposite flat faces of the head of the bearing stud.

This specification signed and witnessed this 6th day of July A. D. 1910.

FLOYD HENRY FOX.

In the presence of—
A. M. PARKINS,
R. N. FLINT.